United States Patent
Mergler et al.

(10) Patent No.: US 7,901,820 B2
(45) Date of Patent: Mar. 8, 2011

(54) SOLID OXIDE FUEL CELL STACK ASSEMBLY AND METHOD FOR FUELING

(75) Inventors: Christopher M. Mergler, West Henrietta, NY (US); Sean M. Kelly, Pittsford, NY (US); Gary D. Blake, Penfield, NY (US)

(73) Assignee: Delphi Technologies, Inc., Troy, MI (US)

(*) Notice: Subject to any disclaimer, the term of this patent is extended or adjusted under 35 U.S.C. 154(b) by 280 days.

(21) Appl. No.: 12/080,589

(22) Filed: Apr. 4, 2008

(65) Prior Publication Data

US 2008/0187799 A1    Aug. 7, 2008

Related U.S. Application Data

(63) Continuation-in-part of application No. 11/231,703, filed on Sep. 21, 2005.

(51) Int. Cl.
    *H01M 8/06* (2006.01)
(52) U.S. Cl. ......... 429/423; 429/425; 429/416; 429/495; 422/188

(58) Field of Classification Search .............. 429/13, 429/17, 19, 20, 26, 34; 422/188
See application file for complete search history.

(56) References Cited

U.S. PATENT DOCUMENTS

| | | |
|---|---|---|
| 4,642,272 A | 2/1987 | Sederquist |
| 2002/0031690 A1 | 3/2002 | Shimazu et al. |
| 2004/0006914 A1* | 1/2004 | Shaaban et al. ............ 48/197 R |
| 2004/0224196 A1 | 11/2004 | Pastula et al. |
| 2007/0065687 A1 | 3/2007 | Kelly |
| 2007/0160880 A1* | 7/2007 | Fischer .................... 429/19 |

OTHER PUBLICATIONS

EP Search Report dated May 26, 2009.

* cited by examiner

*Primary Examiner* — Raymond Alejandro
(74) *Attorney, Agent, or Firm* — Thomas N. Twomey

(57) ABSTRACT

A method for fueling a solid oxide fuel cell stack is provided. The method includes passing a first portion of hydrocarbon fuel through a catalytic hydrocarbon reformer to generate a first reformate. The first reformate is passed through a hydrocarbon cracker to generate a second reformate such that a portion of any non-reformed hydrocarbon fuel in the first reformate is converted to methane. The second reformate is supplied to the fuel cell stack.

6 Claims, 4 Drawing Sheets

SOLID OXIDE FUEL CELL STACK ASSEMBLY AND METHOD FOR FUELING

RELATIONSHIP TO OTHER APPLICATIONS AND PATENTS

The present application is a Continuation-In-Part of a pending U.S. patent application Ser. No. 11/231,703, filed Sep. 21, 2005 and published Mar. 22, 2007 as US Patent Application Publication No. US 2007/0065687 A1.

GOVERNMENT INTEREST

The present invention was supported in part by a U.S. Government contract, no. DE-FC2602NT41246. The United States Government may have rights in the present invention.

TECHNICAL FIELD

The present invention relates to solid oxide fuel cell (SOFC) systems; more particularly, to such systems wherein a portion of the anode tail gas is recirculated directly into the reformer; and most particularly, to a system wherein reformate from a partial-oxidation hydrocarbon reformer, with unprocessed hydrocarbon fuel, is passed through a hydrocarbon cracker ahead of the fuel cell stack to permit internal reforming of small aliphatic residues such as methane within the fuel cell stack.

BACKGROUND OF THE INVENTION

SOFC systems are well known. An SOFC typically is fueled by "reformate" gas, which is the partially oxidized effluent from a catalytic partial oxidation (CPOx) hydrocarbon reformer. Reformate typically includes amounts of carbon monoxide (CO) as fuel in addition to molecular hydrogen ($H_2$). The CPOx reactions also release heat that serves to maintain the temperature of the reformer. A CPOx reformer is a very simple and easily controlled device with good transient behavior and dynamic range. A known disadvantage of a CPOx reformer is that it has a relatively low fuel-processing efficiency that limits overall system efficiency.

To improve stack power density and system efficiency and to reduce carbon precipitation and deposition in the system, it is known in the art to recycle a portion of the tail gas from the stack anodes through the reformer. The stack anode tail gas has a large amount of water vapor and $CO_2$ as well as unreacted $H_2$ and CO gases. When these gases are fed back to the reformer, endothermic "steam reforming" reactions can occur in the fuel reformer. Stack anode tail gas recycle is known to be enhanced by fuel reformer technology that can sustain its temperature in the presence of endothermic reactions. Such technology may consist of a heat exchanger construction wherein hot combustor effluent passes on one side of the heat exchanger (combustor side), and a mix of fuel, air, and recycle gas passes through the other side (reforming side). The reforming side is catalytically treated to allow for the preferred reactions to occur. This mechanization yields high fuel processing efficiencies that, in turn, yield high system efficiencies.

Disadvantages to this approach are complexity and potential durability issues with the heat exchanger/reformer device because of the higher temperatures required for endothermic reforming; the system complexity required to channel the combustor gases through the reformer; and the potential for carbon precipitation in the produced reformate which may have lower water vapor content by volume.

Where natural gas is the fuel, steam reforming with added water (no recycle) is a very common approach. In some cases, the natural gas fuel is pre-reformed to break-down higher hydrocarbons (heavier than methane) and this high-methane mix is fed directly to an SOFC stack. $H_2O$ is typically added to the reformate to allow steam reforming reactions to occur within the SOFC stack itself. This arrangement is known as "Internal Reforming" in the art. In this prior art approach, the heat required for endothermic reforming to occur is supplied by the electrochemical heat released in the SOFC stack, and not by heat exchange with the combustor gases. Internal endothermic reforming within the SOFC stack is very attractive for its high fuel processing efficiencies, but in the prior art it requires a supply of external water injection to the system.

There is a limitation, however, to the range of operation in a system with this fuel processing configuration. The system efficiency is quite high when a fraction, or all, of the fuel can be reformed internally to the stack. The problem is that the reforming process requires the stack to provide the necessary heat to support the endothermic reactions, and it is not capable of providing that heat below a certain system operating power. This means the efficiency of the system, when operating at low electric load, is that of a CPOx system and reaches the highest system efficiencies only when higher loads can support internal reforming.

What is needed in the art is a system mechanization and algorithm that incorporates the benefits of each prior art system configuration in an architecture that allows for full flexibility in fuel processing, incorporating CPOx, endothermic, and internal reforming depending upon the power load of the fuel cell system.

It is a principal object of the present invention to improve the fuel efficiency of a solid oxide fuel cell stack system over the full range of operating loads.

SUMMARY OF THE INVENTION

Briefly described, an SOFC stack system in accordance with the invention includes an endothermic reformer and fuel flow arrangement that permits optimized fuel reforming at all power load levels of the fuel cell stack between 0% and 100%.

A portion of the anode tail gas is recycled into a preparatory mixing chamber wherein the tail gas is combined with fresh air and fuel. The mixture is sent to a main reformer that is configured for endothermic reforming. Reformate from the main reformer, and during higher load operation, unprocessed fuel mixed with reformate, is sent through a hydrocarbon cracker that breaks any hydrocarbons in the reformate into methane before the reformate enters the stack. This invention allows for a reforming strategy that includes the following operation, or any blend thereof. The first mode is at 0% load, and there is no reforming in the stack, all reforming is done in the main reformer. The second mode is at 100% load when all of the fuel is internally reformed by the stack and none of the fuel is reformed in the main reformer. At loads between 0% and 100%, the reforming is a mixture of CPOx and endothermic reforming in the main reformer and internal reforming within the fuel cell stack. This strategy allows the system to take advantage of the highest fuel processing efficiencies available through the full range of stack operation.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
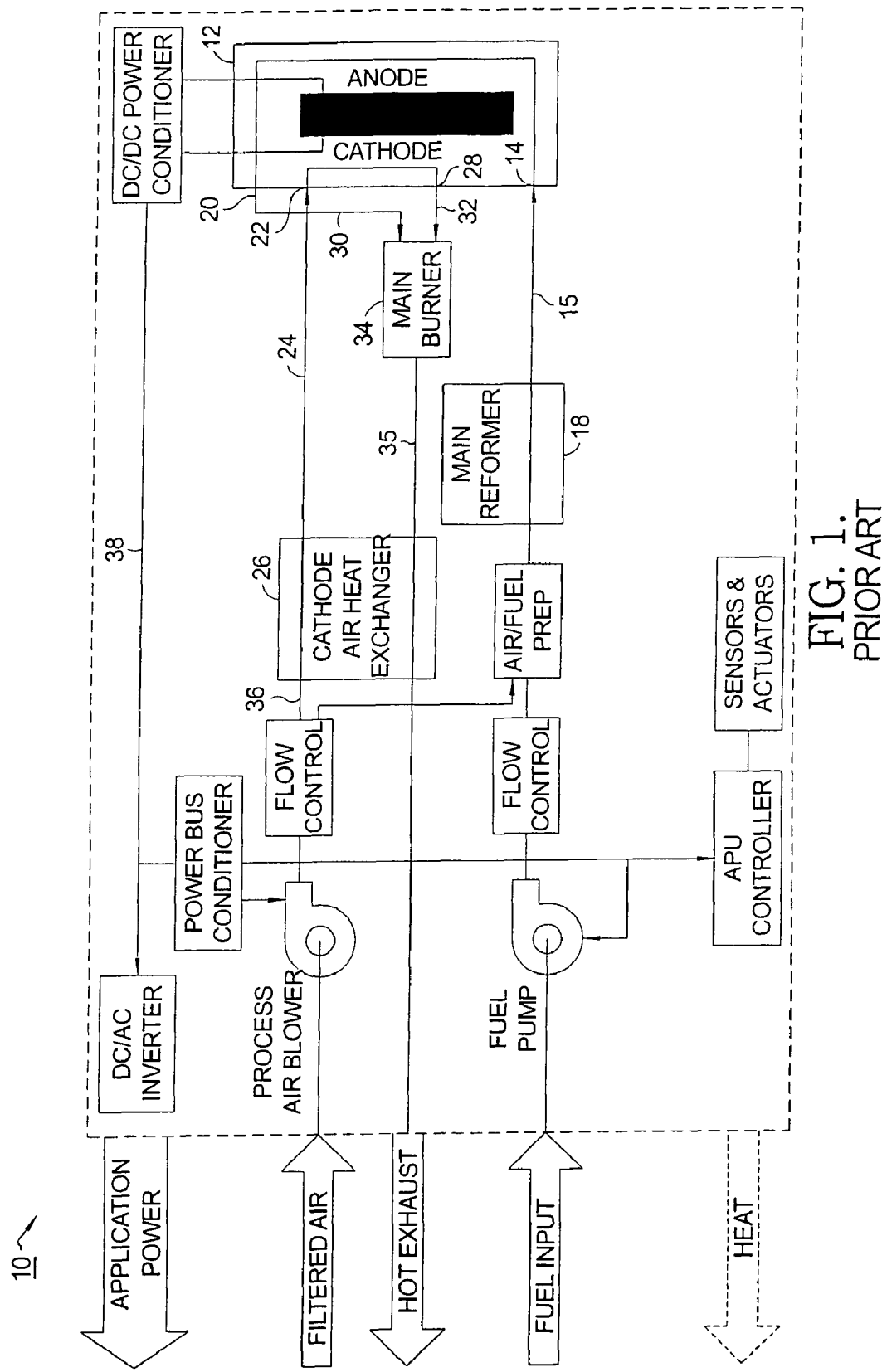
FIG. 1 is a schematic flow diagram of a first prior art SOFC system without recycle of anode tail gas.

Referring to FIG. 1, a first prior art SOFC system 10 comprises an SOFC stack 12 having an anode inlet 14 for reformate 16 from a CPOx reformer 18; an anode tail gas outlet 20; an inlet 22 for heated cathode air 24 from a cathode air heat exchanger 26; and a cathode air outlet 28. Anode tail gas 30 and spent cathode air 32 are fed to a burner 34, the hot exhaust 35 from which is passed through heat exchanger 26 to heat the incoming cathode air 36. The residual potential chemical energy ($H_2$ and CO) in the anode tail gas is not recovered as additional electrical output 38 of the stack but instead is partially recovered as heat energy in exchanger 26.

Figure 2:
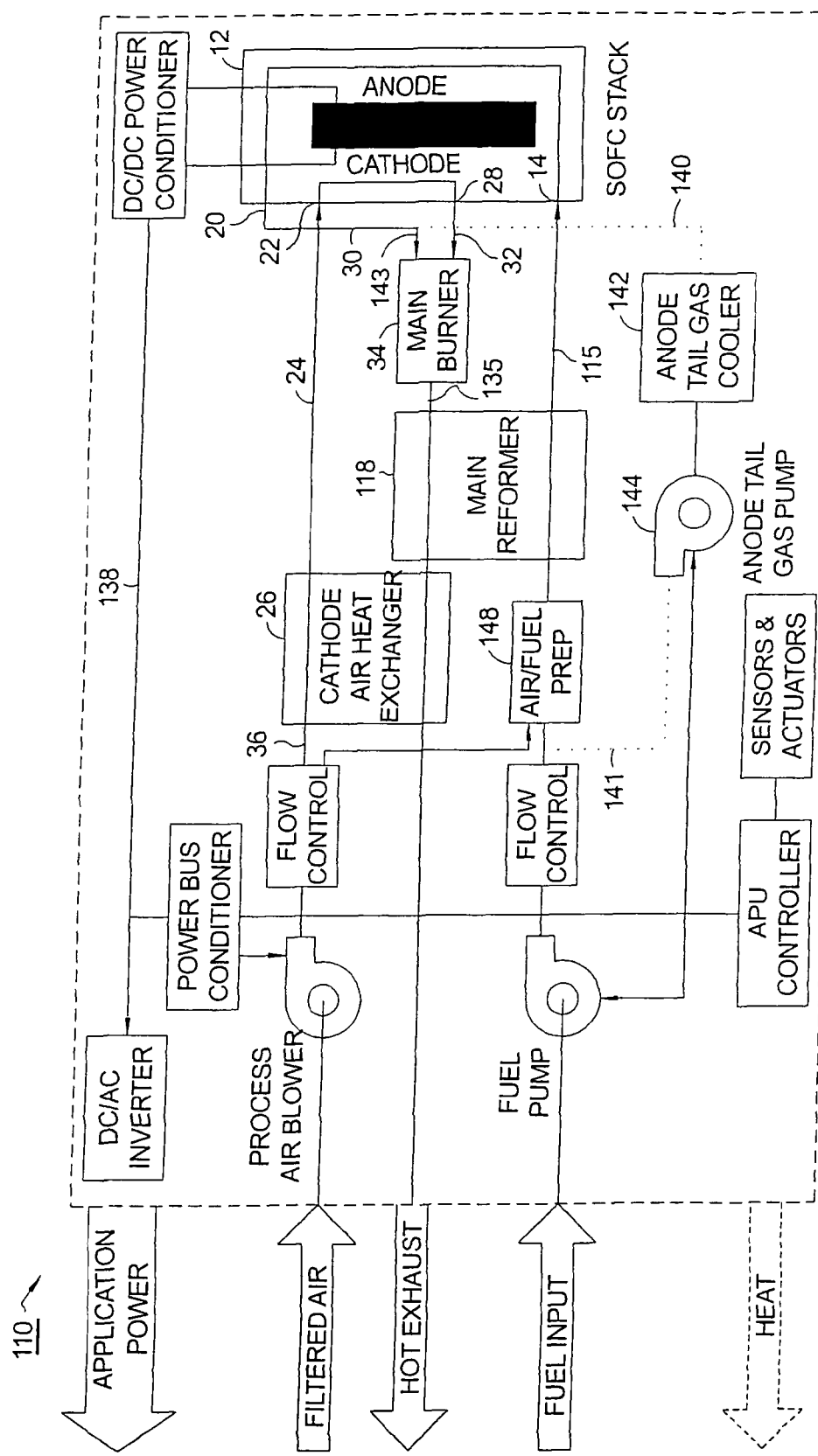
FIG. 2 is a schematic flow diagram of a second prior art SOFC system having recycle of anode tail gas into the fuel stream ahead of the reformer.

Referring to FIG. 2, a second prior art SOFC system 110 comprises the elements just described for first prior art system 10. However, in addition, a first portion 140 of anode tail gas 30 is diverted away from burner 34 to an anode tail gas cooler 142 and thence through an anode tail gas pump 144 which directs cooled portion 141 of the tail gas into an entrance to an air/fuel preparation chamber 148 ahead of endothermic reformer 118. Second portion 143 of anode tail gas 30 is sent to burner 34 as in embodiment 10, and the hot effluent 135 is sent to cathode air heat exchanger 26 via a prior heat exchanger in reformer 118. Fortified reformate 116 is sent to stack anode inlet 14. Thus, residual hydrocarbons in the anode tail gas are exposed to reforming for a second time, and heat is recovered in both the reformer and the cathode air heater. Elevated temperatures in the reformer are necessary to permit endothermic reforming. System 110 is known to improve significantly the fuel efficiency of an SOFC system, resulting in an increase in electrical output 138.

Figure 3:
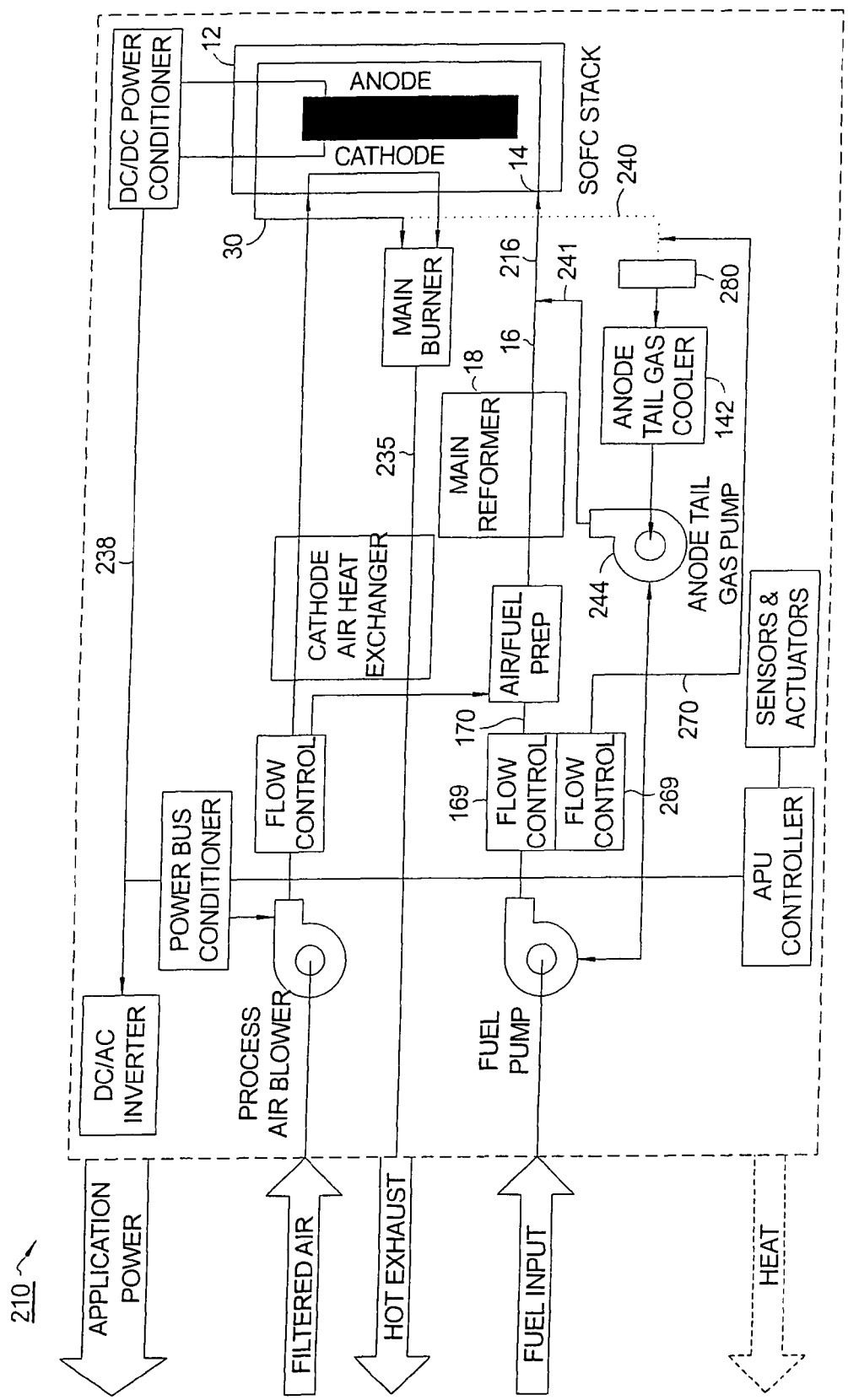
FIG. 3 is a schematic flow diagram of an SOFC system as disclosed in US Published Patent Application No. 2007/0065687 A1, the relevant disclosure of which is incorporated here, showing recycle of anode tail gas into the inlet to the SOFC stack.

Referring to FIG. 3, SOFC system 210 as disclosed in co-pending application Ser. No. 11/231,703 is substantially the same as that of prior art embodiment 110 except that anode tail gas 241 from pump 244 is directed via pump 244 to the anode inlet 14 of stack 12, bypassing reformer 18, where the anode tail gas joins with reformate 16 from reformer 18 to form a feed stream 216. The burner effluent 235 bypasses reformer 18. Because reformer 18 is a CPOx reformer, in addition to the primary, independently controlled fuel flow 169 supplying fuel 170 to reformer 18, a secondary, independently controlled fuel flow 269 is provided for supplying secondary fuel 270 into anode tail gas portion 240 to optimize the mixture feed stream 216 provided to stack anode inlet 12. Preferably, the tail gas/secondary fuel mixture is passed through a clean-up catalyst 280 to reduce longer chain hydrocarbons to methane, $H_2$, and CO.

Primary fuel reformer 18, which is a simple and robust CPOx technology reformer, supplies between 0% and 100% of the reformate to the SOFC stack, with typical values between 30% and 70%. At 100%, there is no secondary fuel injection 270 to the recycle feed stream 216 and no internal reforming in the stack (0% internal reforming). At 0%, there is no CPOx reformate 16 to the stack and all of the secondary fuel 270 from flow control 269 is internally reformed (100% internal reforming). This blended strategy, referred to herein as "Light Internal Reforming", generally results in a reformate feed stream 216 to the stack that has a high concentration of $H_2$ and $H_2O$, as well as moderate amounts of CO and $CO_2$, and a small amount (0-30%) of methane gas ($CH_4$). This arrangement allows for endothermic reforming within the stack itself for high fuel processing efficiencies and high electric output 238. Further, this arrangement allows for reduced internal reforming load (<100%) on the stack which can improve durability. In addition, the CPOx reformer primary fuel processing serves the needs of the system during the start-up phase when the stacks are not operational but are warming-up, as well as under transient conditions where less internal reforming may be desirable.

A problem with system 210 is that internal reforming is only available at higher electric loads. Thus, system 210 is relatively inefficient under low load conditions. Further, the benefits of passing the anode recycle through the reformer, as in system 110, are not available. Thus, system 210 cannot enjoy use of anode recycle in endothermic reforming at any load condition.

What is needed is a flexible system that allows for endothermic reforming in the main reformer at low load conditions, internal reforming in the fuel cell stack at higher load conditions, and a hybrid mixture of endothermic and internal reforming at intermediate load conditions.

Figure 4:
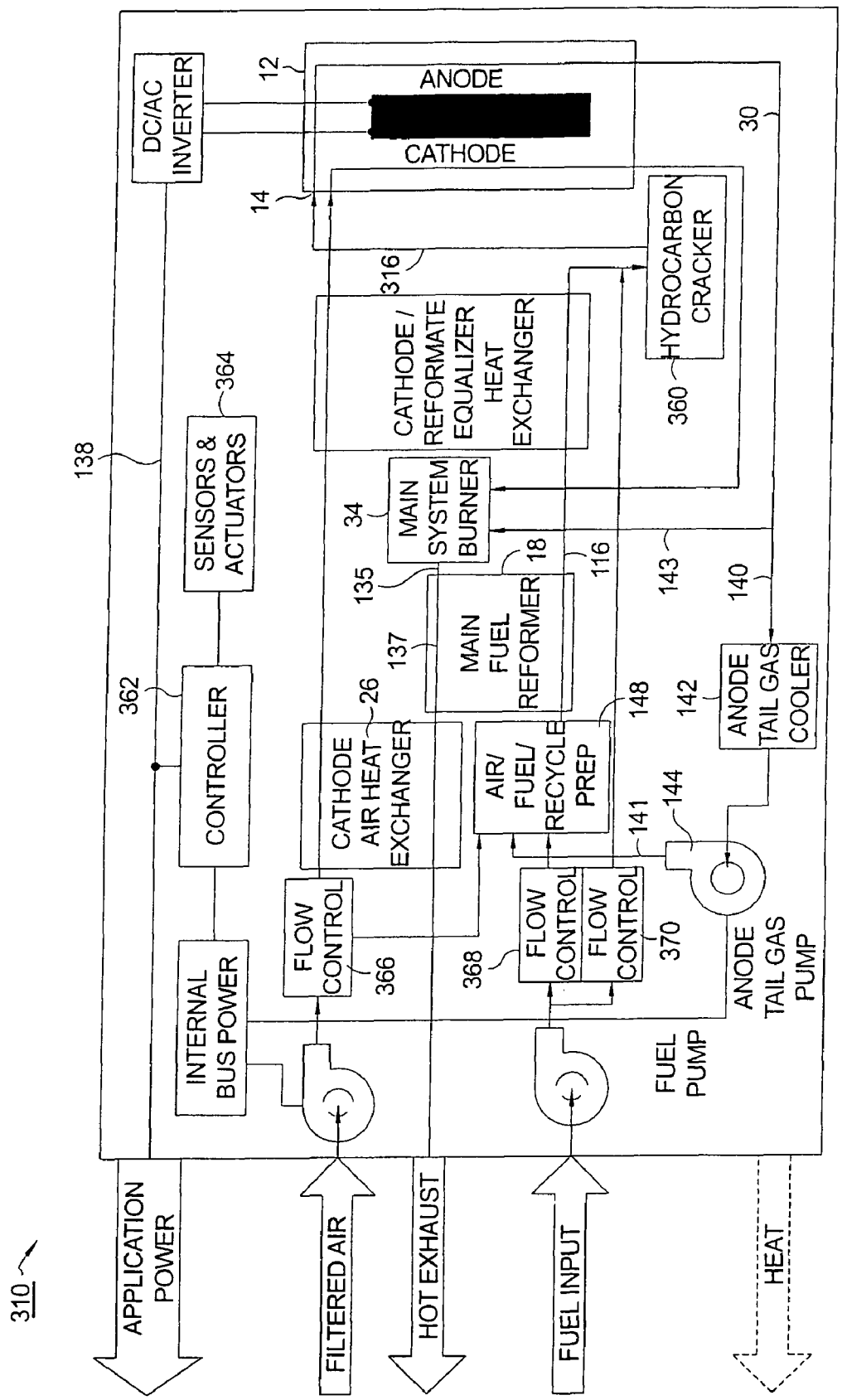
FIG. 4 is a schematic flow diagram of an improved, hybrid SOFC system in accordance with the present invention.

Referring to FIG. 4, a hybrid, flexible SOFC system 310 in accordance with the invention comprises most of the elements just described for second prior art system 110 which need not be repeated here. The following elements, however, are of special interest in system 310.

First portion 140 of anode tail gas 30 is diverted ahead of burner 34 to anode tail gas cooler 142 and thence through anode tail gas pump 144 which directs cooled portion 141 into an air/fuel preparation chamber 148 ahead of endothermic reformer 18. Second portion 143 of anode tail gas 30 is sent to burner 34, and the hot effluent 135 is sent to cathode air heat exchanger 26 via a heat exchanger 137 in reformer 18. Fortified reformate 116, including secondary fuel input from 370 is sent to stack anode inlet 14 via a hydrocarbon cracker 360 to ensure that any residual hydrocarbon molecules in reformate 116 are small enough, and preferably are only methane, to be internally reformed within SOFC stack 12. Hydrocarbon cracker 360 may be of any type as are well known in the art for breaking long-chain aliphatic compounds into short-chain aliphatic compounds. Thus, under relatively low stack load conditions, reformate 316 entering stack 12 has high concentrations of $H_2$ and $H_2O$, moderate amounts of CO and $CO_2$, and a small amount of methane gas ($CH_4$); whereas, under relatively high stack load conditions, reformate 316 entering stack 12 has a high concentration of $H_2O$, relatively little $H_2$ and CO, and a large amount of methane gas ($CH_4$).

Reformer 18 may be fueled by a wide range of hydrocarbon fuels including but not limited to gasoline, JP-8, diesel, LPG, and natural gas. Further, the addition of hydrocarbon cracker 360 permits operation of stack 12 at any ratio of endothermic reforming to internal reforming between 100% endothermic and 100% internal, depending upon load 138.

In operation, controller 362 senses demanded load 138 and commands actuators 364 that control at least air flow 366 and fuel flows 368,370 with programmed responses to provide the optimal endothermic/internal reforming ratio.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for fueling a solid oxide fuel cell stack in a fuel cell system including a catalytic hydrocarbon reformer and a hydrocarbon cracker, comprising the steps of:
   a) passing a first portion of hydrocarbon fuel through said catalytic hydrocarbon reformer to generate a first reformate wherein said hydrocarbon fuel has been reformed in the range of 0%-100%;
   b) passing said first reformate through said hydrocarbon cracker to generate a second reformate wherein a portion of any non-reformed hydrocarbon fuel from said first portion of hydrocarbon fuel in said first reformate is converted to methane;
   c) supplying said second reformate to said solid oxide fuel cell stack, and comprising the further step of adding a second portion of said hydrocarbon fuel to said first reformate ahead of said hydrocarbon cracker; and wherein said catalytic hydrocarbon reformer is an endothermic reformer.

2. A method in accordance with claim 1 including the step of adding a portion of anode tailgas from said stack to said first portion of hydrocarbon fuel.

3. A method in accordance with claim 1 comprising the further step of reforming said methane internally within said stack.

4. A method in accordance with claim 1 wherein said percentage of reformed hydrocarbon fuel in said first reformate is proportional to an electrical load on said fuel cell stack.

5. A method in accordance with claim 1 wherein said hydrocarbon fuel is selected from the group consisting of gasoline, JP-8, diesel, LPG, natural gas, and combinations thereof.

6. A method in accordance with claim 1 wherein said hydrocarbon fuel is reformed about 0% by said catalytic hydrocarbon reformer when said solid oxide fuel cell stack has a maximum load applied thereto, and wherein said hydrocarbon fuel is reformed about 100% by said catalytic hydrocarbon reformer when said solid oxide fuel cell stack has no load applied thereto.

* * * * *